UNITED STATES PATENT OFFICE.

WILLIAM RADAM, OF AUSTIN, TEXAS.

COMPOSITION FOR PRESERVING FOOD.

SPECIFICATION forming part of Letters Patent No. 349,900, dated September 28, 1886.

Application filed June 8, 1886. Serial No. 204,477. (No specimens.)

*To all whom it may concern:*

Be it known that I, WILLIAM RADAM, of Austin, in the county of Travis and State of Texas, have invented a new and Improved Fumigating Composition for Preserving and Purifying Purposes, of which the following is a full, clear, and exact description.

My invention relates to combustible compositions, which, when ignited, produce a gas or gases that have preservative and purifying effects upon various substances and surfaces or places exposed to the fumes. It is more especially designed, however, for preserving fruits, vegetables, meats, and other perishable articles.

The composition consists of the following ingredients, combined in about the proportions stated—viz., powdered sulphur, four ounces; nitrate of soda, two ounces; black oxide of manganese, one ounce; sandal-wood, one ounce; chloride of potash, one-half ounce. These ingredients are to be thoroughly mixed.

In using the above-named composition for preservative purposes one method which I adopt is as follows: I place the articles or substances to be preserved in an air-tight box or receptacle in any suitable manner that will expose them to the fumes of the burning composition or gases, and before closing said box place a quantity of the composition in a saucer or any suitable iron or other receptacle placed on top or elsewhere within the box, and ignite the composition in order that the gases generated thereby may act upon or among the substances to be preserved, and so kill all fungus, germs, parasites, and other matter producing fermentation or decay, &c. To do this the box is closed, and the articles or substances in it to be preserved exposed to the action of the gas or gases for a period of two hours, more or less. The same treatment may be carried out upon a larger scale—as, for instance, by exposing the articles or substances to be preserved in larger quantities to the action of the gases within an air-tight railroad-car or room for a period of about eight hours, more or less. In either case, however, after the articles or substances under treatment have thus been exposed to the action of the gas or gases generated by the combustion of the composition for a sufficient length of time to produce the desired result, the box or receptacle containing them is opened and said articles or substances are exposed to the air for twenty-four hours (more or less) to allow of the escape of the gas before sealing them up or packing them away. Fruit, vegetables, meats, eggs, and various other solid, also different watery or liquid substances, may be thus preserved and retain their natural taste, most fruits even holding their natural color and keeping for years. Peaches and other fruits may be successfully dried, if previously exposed to the action of the gas generated by the composition for one hour, more or less. Likewise groceries infested with vermin or affected with mold may be purified in a few hours by exposing them for a few hours to said gas or gases.

The gas generated by the burning of the composition may also be used for general fumigating purposes, as it is both quick and powerful in its action, and water or other liquids may be purified by it. Goods treated by it will be free, or nearly so, from any penetrating or objectionable odor, which is so great an objection, especially in the case of fruits and preserves, where sulphur in large quantities has been used to effect their preservation.

In my composition I use but a small proportion of sulphur—that is, relatively to the whole mass of ingredients in the composition—and the other ingredients, which are powerful antiseptics, will have the effect of making the sulphuric acid scarcely perceptible, the sandalum or sandal-wood having an important action in this respect, consequently fruits, for instance, preserved by the gas will retain both their color and flavor, and may be kept for a prolonged period or be shipped thousands of miles without risk of decay.

I am aware that certain of the ingredients in my composition, including sulphur and nitrate of soda, also nitrate of potash, in very different proportions, however, have before been used for preserving perishable articles or substances. I am also aware that not only sulphur and nitrate have been used together for this purpose, but that fragrant barks—such as cascarilla—have been used with sulphur in such compounds, and that sulphur, niter, and a chloride have been used together. Such, therefore, I do not claim.

Having thus described my invention, what I claim as new, and desire to secure by Letters Patent, is—

The within-described fumigating composition for preserving and purifying purposes, the same consisting of sulphur, nitrate of soda, black oxide of manganese, sandal-wood, and chloride of potash, in or about the proportions specified.

WILLIAM RADAM.

Witnesses:
 ADOLPHUS G. LUCK,
 RICHARD E. STROMBERG.